United States Patent
Cao et al.

(10) Patent No.: US 12,354,107 B2
(45) Date of Patent: *Jul. 8, 2025

(54) SYSTEM, METHOD, AND COMPUTER PROGRAM PRODUCT FOR LEARNING CONTINUOUS EMBEDDING SPACE OF REAL TIME PAYMENT TRANSACTIONS

(71) Applicant: Visa International Service Association, San Francisco, CA (US)

(72) Inventors: Shi Cao, Austin, TX (US); Xiao Tian, Austin, TX (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/533,815

(22) Filed: Dec. 8, 2023

(65) Prior Publication Data

US 2024/0104573 A1    Mar. 28, 2024

Related U.S. Application Data

(63) Continuation of application No. 17/490,325, filed on Sep. 30, 2021, now Pat. No. 11,847,654.

(51) Int. Cl.
*G06Q 20/40* (2012.01)
*G06N 5/022* (2023.01)
*G06N 5/04* (2023.01)

(52) U.S. Cl.
CPC ........ *G06Q 20/4016* (2013.01); *G06N 5/022* (2013.01); *G06N 5/04* (2013.01)

(58) Field of Classification Search
CPC .......... G06N 20/00; G06N 3/08; G06N 5/022; G06N 5/04; G06Q 20/4016
See application file for complete search history.

(56) References Cited

U.S. PATENT DOCUMENTS

2015/0073981 A1    3/2015  Adjaoute
2020/0074472 A1*   3/2020  Adjaoute ............... G06N 5/048
(Continued)

FOREIGN PATENT DOCUMENTS

CN    108369698 A    8/2018
CN    108960304 A    12/2018
CN    110869962 A    3/2020

OTHER PUBLICATIONS

Jason Tam, Negative Sampling (in Nympy), Data Science, https://tech.hbc.com/2018-03-23-negative-sampling-in-numpy.html (Year: 2018).*

(Continued)

*Primary Examiner* — Hao Fu
(74) *Attorney, Agent, or Firm* — The Webb Law Firm

(57) ABSTRACT

Methods, systems, and computer program products for learning continuous embedding space of real time payment (RTP) transactions are provided. A method may include receiving RTP data including a plurality of attributes, including a sender and a receiver. One attribute is selected as a target attribute. The remaining attributes are input into a first machine learning model (e.g., NLP model), comprising at least one embedding layer and one hidden layer, which is trained to predict the target attribute. After the model is trained, each of the remaining attributes are converted to a first vector using the at least one embedding layer of the machine learning model to form a first set of vectors. The first set of vectors are stored and subsequently input into a second machine learning model to perform at least one second task different than the first task.

9 Claims, 9 Drawing Sheets

(56) References Cited

U.S. PATENT DOCUMENTS

| | | |
|---|---|---|
| 2021/0065191 A1 | 3/2021 | De Shetler et al. |
| 2021/0103926 A1* | 4/2021 | Wu .................... G06N 20/00 |
| 2022/0103589 A1* | 3/2022 | Shen ............... G06Q 10/0635 |

OTHER PUBLICATIONS

Baldassini et al., "client2vec: Towards Systematic Baselines for Banking Applications", BBVA Data & Analytics, arXiv:1802.04198v1, 2018, pp. 1-10.

Dayioglugil et al., "Continuous Embedding Spaces for Bank Transaction Data", International Symposium on Methodologies for Intelligent Systems, 2017, pp. 1-7, Springer-Verlag, Berlin Heidelberg.

Doan et al., "Generating Realistic Sequences of Customer-level Transactions for Retail Datasets", IEEE ICDM Workshop on Data Mining for Services 2018, 2019, pp. 1-9.

Esmeli et al., "Using Word2Vec Recommendation for Improved Purchase Prediction", 2020 International Joint Conference on Neural Networks, 2020, pp. 1-8.

Guo et al., "Entity Embeddings of Categorical Variables", arXiv:1604.06737v1, 2016, pp. 1-9. Retrieved from https://arxiv.org/abs/1604.06737.

Nguyen et al., "Trans2Vec: Learning Transaction Embedding via Items and Frequent Itemsets", The Pacific-Asia Conference on Knowledge Discovery and Data Mining, 2018, pp. 361-372, Melbourne, Australia.

Tam, "Negative Sampling (in Nympy)", Data Science, 2018. Retrieved from https://tech.hbc.com/2018-03-23-negative-sampling-in-numpy.html.

* cited by examiner

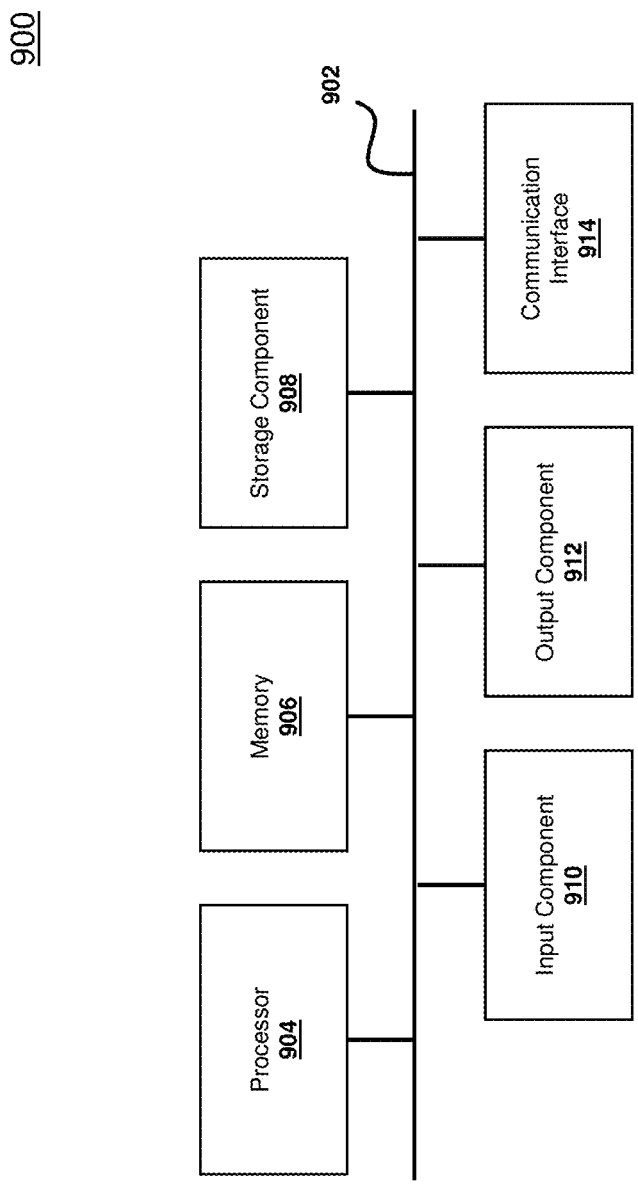

SYSTEM, METHOD, AND COMPUTER PROGRAM PRODUCT FOR LEARNING CONTINUOUS EMBEDDING SPACE OF REAL TIME PAYMENT TRANSACTIONS

CROSS-REFERENCE TO RELATED APPLICATIONS

This application is a continuation of U.S. patent application Ser. No. 17/490,325, filed Sep. 30, 2021, the disclosure of which is hereby incorporated by reference in its entirety.

BACKGROUND

1. Field

This disclosure relates generally to learning continuous embedding spaces and, in some non-limiting embodiments or aspects, to systems, methods, and computer program products for learning continuous embedding space of real time payment (RTP) transactions.

2. Technical Considerations

Real time payment (RTP) transactions are a new and emerging type of financial transactions. RTP transactions always involve at least a sender and a receiver (e.g., a debtor and a creditor, respectively). Understanding of RTP transaction data may be desirable for certain tasks, such as risk management or behavioral analysis.

However, certain techniques require domain knowledge to better understand data and select the most relevant features for machine learning and artificial intelligence modeling. Additionally, certain types of data, such as categorical data (e.g., transaction type, certain account information, and/or certain customer information), are not suitable for machine learning models. Furthermore, certain techniques focus on one type of embedding (e.g., consumer, issuer, or account level embeddings) or partial transaction entities. Using only customer, client, or account level embeddings results in the embeddings not including transaction level information and results in data for new customers facing a cold start. Using only partial transaction entities results in the embeddings not including the issuer or account information.

Therefore, there is a need for improved techniques for learning RTP transaction embeddings.

SUMMARY

According to non-limiting embodiments or aspects, provided is a method comprising: receiving, with at least one processor, RTP data associated with a plurality of RTP transactions, wherein the RTP data for each RTP transaction of the plurality of RTP transactions comprises a plurality of attributes, the plurality of attributes including a sender and a receiver; selecting, with the at least one processor, one attribute of the plurality of attributes as a target attribute, wherein the plurality of attributes other than the target attribute comprise a plurality of remaining attributes; training, with the at least one processor, a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, convert-ing, with the at least one processor, each attribute of the plurality of remaining attributes to a first vector using the at least one embedding layer of the first machine learning model to form a first set of vectors; storing, with the at least one processor, the first set of vectors; and inputting, with the at least one processor, the first set of vectors into a second machine learning model to perform at least one second task different than the first task.

In non-limiting embodiments or aspects, the RTP data for each RTP transaction of the plurality of RTP transactions comprises a plurality of fields, each respective field of the plurality of fields corresponding to a respective attribute of the plurality of attributes. In some non-limiting embodiments or aspects, the first machine learning model comprises a natural language processing (NLP) model, and wherein the training further comprises inputting, with the at least one processor, each of the plurality of attributes of each RTP transaction into the NLP model as a word of a sentence. In some non-limiting embodiments or aspects, the target attribute comprises a continuous value field. In some non-limiting embodiments or aspects, the method further comprises generating, with the at least one processor, a plurality of categories; and sorting, with the at least one processor, each target attribute into one of the plurality of categories based on a value of the target attribute, wherein the plurality of categories each represent a range of values of the continuous value field. In some non-limiting embodiments or aspects, training the first machine learning model to perform the first task further comprises: creating, with the at least one processor, a negative sample of the target attribute based on an equal probability of selecting any single target attribute sorted into one of the plurality of categories, wherein creating the negative sample comprises: determining, with the at least one processor, a frequency at which the target attribute appears in each of the plurality of categories; and performing, with the at least one processor, negative sampling of the target attribute based on the frequency at which the target attribute appears in each of the plurality of categories. In some non-limiting embodiments or aspects, the second machine learning model if a fraud detection model. In some non-limiting embodiments or aspects, the method further comprises: generating, with the at least one processor, a graph comprising a plurality of nodes based on the first set of vectors, wherein each of the plurality of nodes represents one of the plurality of RTP transactions.

According to non-limiting embodiments or aspects, provided is a system comprising at least one processor programmed or configured to: receive RTP data associated with a plurality of RTP transactions, wherein the RTP data for each RTP transaction of the plurality of RTP transactions comprises a plurality of attributes, the plurality of attributes including a sender and a receiver; select one attribute of the plurality of attributes as a target attribute, wherein the plurality of attributes other than the target attribute comprise a plurality of remaining attributes; train a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, convert each attribute of the plurality of remaining attributes to a first vector using the at least one embedding layer of the first machine learning model to form a first set of vectors; store the first set of vectors; and input the first set of vectors into a second machine learning model to perform at least one second task different than the first task.

In some non-limiting embodiments or aspects, the RTP data for each RTP transaction of the plurality of RTP transactions comprises a plurality of fields, each respective field of the plurality of fields corresponding to a respective attribute of the plurality of attributes. In some non-limiting embodiments or aspects, the first machine learning model comprises a NLP model and wherein, when training the first machine learning model to perform the first task, the at least one processor is further programmed or configured to: input each of the plurality of attributes of each RTP transaction into the NLP model as a word of a sentence. In some non-limiting embodiments or aspects, the target attribute comprises a continuous value field. In some non-limiting embodiments or aspects, the processor is further programmed or configured to: generate a plurality of categories; and sort each target attribute into one of the plurality of categories based on a value of the target attribute, wherein the plurality of categories each represent a range of values of the continuous value field. In some non-limiting embodiments or aspects, when training the first machine learning model to perform the first task, the at least one processor is further programmed or configured to: create a negative sample of the target attribute based on an equal probability of selecting any single target attribute sorted into one of the plurality of categories, wherein creating the negative sample comprises: determining a frequency at which the target attribute appears in each of the plurality of categories; and performing negative sampling of the target attribute based on the frequency at which the target attribute appears in each of the plurality of categories. In some non-limiting embodiments or aspects, the second machine learning model comprises a fraud detection model. In some non-limiting embodiments or aspects, the at least one processor is further programmed or configured to: generate a graph comprising a plurality of nodes based on the first set of vectors, wherein each of the plurality of nodes represents one of the plurality of RTP transactions.

According to non-limiting embodiments or aspects, provided is a computer program product comprising at least one non-transitory computer-readable medium including one or more instructions that, when executed by at least one processor, cause the at least one processor to: receive RTP data associated with a plurality of RTP transactions, wherein the RTP data for each RTP transaction of the plurality of RTP transactions comprises a plurality of attributes, the plurality of attributes including a sender and a receiver; select one attribute of the plurality of attributes as a target attribute, wherein the plurality of attributes other than the target attribute comprise a plurality of remaining attributes; train a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, convert each attribute of the plurality of remaining attributes to a first vector using the at least one embedding layer of the first machine learning model to form a first set of vectors; store the first set of vectors; and input the first set of vectors into a second machine learning model to perform at least one second task different than the first task.

In non-limiting embodiments or aspects, the RTP data for each RTP transaction of the plurality of RTP transactions comprises a plurality of fields, each respective field of the plurality of fields corresponding to a respective attribute of the plurality of attributes. In some non-limiting embodiments or aspects, the first machine learning model comprises a NLP model and wherein the one or more instructions that cause the at least one processor to train the first machine learning model to perform the first task further cause the at least one processor to: input each of the plurality of attributes of each RTP transaction into the NLP model as a word of a sentence, wherein the target attribute comprises a continuous value field. In some non-limiting embodiments or aspects, the method may further generate a plurality of categories; sort each target attribute into one of the plurality of categories based on a value of the target attribute, wherein the plurality of categories each represent a range of values of the continuous value field; create a negative sample of the target attribute based on an equal probability of selecting any single target attribute sorted into one of the plurality of categories, wherein creating the negative sample comprises: determining a frequency at which the target attribute appears in each of the plurality of categories; and performing negative sampling of the target attribute based on the frequency at which the target attribute appears in each of the plurality of categories; and generate a graph comprising a plurality of nodes based on the first set of vectors, wherein each of the plurality of nodes represents one of the plurality of RTP transactions. In some non-limiting embodiments or aspects, the second machine learning model comprises a fraud detection model.

Other non-limiting embodiments or aspects will be set forth in the following numbered clauses:

Clause 1: A computer-implemented method, comprising: receiving, with at least one processor, RTP data associated with a plurality of RTP transactions, wherein the RTP data for each RTP transaction of the plurality of RTP transactions comprises a plurality of attributes, the plurality of attributes including a sender and a receiver; selecting, with the at least one processor, one attribute of the plurality of attributes as a target attribute, wherein the plurality of attributes other than the target attribute comprise a plurality of remaining attributes; training, with the at least one processor, a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, converting, with the at least one processor, each attribute of the plurality of remaining attributes to a first vector using the at least one embedding layer of the first machine learning model to form a first set of vectors; storing, with the at least one processor, the first set of vectors; and inputting, with the at least one processor, the first set of vectors into a second machine learning model to perform at least one second task different than the first task.

Clause 2: The computer-implemented method of clause 1, wherein the RTP data for each RTP transaction of the plurality of RTP transactions comprises a plurality of fields, each respective field of the plurality of fields corresponding to a respective attribute of the plurality of attributes.

Clause 3: The computer-implemented method of clauses 1 or 2, wherein the first machine learning model comprises a NLP model, and wherein the training further comprises inputting, with the at least one processor, each of the plurality of attributes of each RTP transaction into the NLP model as a word of a sentence.

Clause 4: The computer-implemented method of any of clauses 1-3, wherein the target attribute comprises a continuous value field.

Clause 5: The computer-implemented method of any of clauses 1-4, further comprising: generating, with the at least one processor, a plurality of categories; and sorting, with the at least one processor, each target attribute into one of the plurality of categories based on a value of the target attribute, wherein the plurality of categories each represent a range of values of the continuous value field.

Clause 6: The computer-implemented method of any of clauses 1-5, wherein training the first machine learning model to perform the first task further comprises: creating, with the at least one processor, a negative sample of the target attribute based on an equal probability of selecting any single target attribute sorted into one of the plurality of categories, wherein creating the negative sample comprises: determining, with the at least one processor, a frequency at which the target attribute appears in each of the plurality of categories; and performing, with the at least one processor, negative sampling of the target attribute based on the frequency at which the target attribute appears in each of the plurality of categories.

Clause 7: The computer-implemented method of any of clauses 1-6, wherein the second machine learning model comprises a fraud detection model.

Clause 8: The computer-implemented method of any of clauses 1-7, further comprising: generating, with the at least one processor, a graph comprising a plurality of nodes based on the first set of vectors, wherein each of the plurality of nodes represents one of the plurality of RTP transactions.

Clause 9: A system comprising at least one processor programmed or configured to: receive RTP data associated with a plurality of RTP transactions, wherein the RTP data for each RTP transaction of the plurality of RTP transactions comprises a plurality of attributes, the plurality of attributes including a sender and a receiver; select one attribute of the plurality of attributes as a target attribute, wherein the plurality of attributes other than the target attribute comprise a plurality of remaining attributes; train a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, convert each attribute of the plurality of remaining attributes to a first vector using the at least one embedding layer of the first machine learning model to form a first set of vectors; store the first set of vectors; and input the first set of vectors into a second machine learning model to perform at least one second task different than the first task.

Clause 10: The system of clause 9, wherein the RTP data for each RTP transaction of the plurality of RTP transactions comprises a plurality of fields, each respective field of the plurality of fields corresponding to a respective attribute of the plurality of attributes.

Clause 11: The system of clauses 9 or 10, wherein the first machine learning model comprises a NLP model and wherein, when training the first machine learning model to perform the first task, the at least one processor is further programmed or configured to: input each of the plurality of attributes of each RTP transaction into the NLP model as a word of a sentence.

Clause 12: The system of any one of clauses 9-11, wherein the target attribute comprises a continuous value field.

Clause 13: The system of any one of clauses 9-12, wherein the processor is further programmed or configured to: generate a plurality of categories; and sort each target attribute into one of the plurality of categories based on a value of the target attribute, wherein the plurality of categories each represent a range of values of the continuous value field.

Clause 14: The system of any one of clauses 9-13, wherein when training the first machine learning model to perform the first task, the at least one processor is further programmed or configured to: create a negative sample of the target attribute based on an equal probability of selecting any single target attribute sorted in one of the plurality of categories, wherein creating the negative sample comprises: determining a frequency at which the target attribute appears in each of the plurality of categories; and performing negative sampling of the target attribute based on the frequency at which the target attribute appears in each of the plurality of categories.

Clause 15: The system of any one of clauses 9-14, wherein the second machine learning model comprises a fraud detection model.

Clause 16: The system of any one of clauses 9-15, wherein the at least one processor is further programmed or configured to: generate a graph comprising a plurality of nodes based on the first set of vectors, wherein each of the plurality of nodes represents one of the plurality of RTP transactions.

Clause 17: A computer program product comprising at least one non-transitory computer-readable medium including one or more instructions that, when executed by at least one processor, cause the at least one processor to: receive RTP data associated with a plurality of RTP transactions, wherein the RTP data for each RTP transaction of the plurality of RTP transactions comprises a plurality of attributes, the plurality of attributes including a sender and a receiver; select one attribute of the plurality of attributes as a target attribute, wherein the plurality of attributes other than the target attribute comprise a plurality of remaining attributes; train a first machine learning model to perform a first task comprising predicting the target attribute based on inputting the plurality of remaining attributes for each of the plurality of RTP transactions into the first machine learning model, wherein the first machine learning model comprises at least one embedding layer and at least one hidden layer; after training the model, convert each attribute of the plurality of remaining attributes to a first vector using the at least one embedding layer of the first machine learning model to form a first set of vectors; store the first set of vectors; and input the first set of vectors into a second machine learning model to perform at least one second task different than the first task.

Clause 18: The computer program product of clause 17, wherein the RTP data for each RTP transaction of the plurality of RTP transactions comprises a plurality of fields, each respective field of the plurality of fields corresponding to a respective attribute of the plurality of attributes.

Clause 19: The computer program product of clauses 17 or 18, wherein the first machine learning model comprises a NLP model and wherein the one or more instructions that cause the at least one processor to train the first machine learning model to perform the first task further cause the at least one processor to: input each of the plurality of attributes of each RTP transaction into the NLP model as a word of a sentence.

Clause 20: The computer program product of any one of clauses 17-19, wherein the target attribute comprises a continuous value field.

Clause 21: The computer program product of any one of clauses 17-20, wherein the one or more instructions that cause the at least one processor to train the first machine learning model to perform the first task further cause the at least one processor to: generate a plurality of categories; and sort each target attribute into one of the plurality of categories based on a value of the target attribute, wherein the plurality of categories each represent a range of values of the continuous value field.

Clause 22: The computer program product of any one of clauses 17-21, wherein the one or more instructions that cause the at least one processor to train the first machine learning model to perform the first task further cause the at least one processor to: create a negative sample of the target attribute based on an equal probability of selecting any single target attribute sorted in one of the plurality of categories, wherein when creating the negative sample comprises: determining a frequency at which the target attribute appears in each of the plurality of categories; and performing negative sampling of the target attribute based on the frequency at which the target attribute appears in each of the plurality of categories.

Clause 23: The computer program product of any one of clauses 17-22, wherein the second machine learning model comprises a fraud detection model.

Clause 24: The computer program product of any one of clauses 17-23, wherein the one or more instructions that cause the at least one processor to train the first machine learning model to perform the first task further cause the at least one processor to: generate a graph comprising a plurality of nodes based on the first set of vectors, wherein each of the plurality of nodes represents one of the plurality of RTP transactions.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which:

FIG. 9 illustrates example components of a device used in connection with non-limiting embodiments.

DESCRIPTION OF THE PREFERRED EMBODIMENTS

Figure 1:
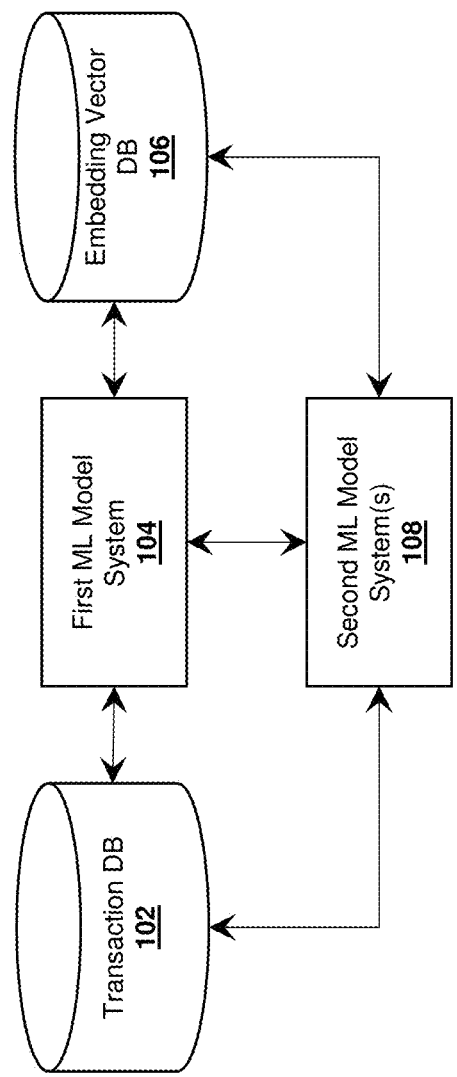
FIG. 1 is a schematic diagram of a system for learning continuous embedding space of real time payment (RTP) transactions according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/ or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

This disclosure provides a new technique for learning RTP transaction embeddings by learning consumer, issuer, and/or account level information, as well as transaction level information at the same time. For example, the disclosed technique describes receiving RTP data including a plurality of attributes, including a sender and a receiver. One attribute is selected from the plurality of attributes as a target attribute. The remaining attributes are input into a first machine learning model (e.g., NLP model), comprising at least one embedding layer and at least one hidden layer, which is trained to perform a first task (e.g., predict the target attribute). After the model is trained, each of the remaining attributes are converted to a first vector using the at least one embedding layer of the first machine learning model to form a first set of vectors. The first set of vectors are stored and subsequently input into a second machine learning model, which is trained to perform at least one second task that is different than the first task. An advantage of using RTP transaction data is that there is a pair-wise relationship in RTP transactions. In other words, RTP transactions always involve at least two entities, a sender and a receiver (e.g., a debtor and a creditor, respectively). An additional advantage of the disclosed subject matter is that the machine learning model(s) can learn continuous vector embeddings of RTP transactions without domain knowledge. Once the machine learning model(s) are trained, the embeddings may be used as inputs for other machine learning models (e.g., fraud detection models, product recommendation models, non-compliance detection models, anomaly detection models, and/or the like). As such, the disclosed techniques address issues associated with fraud detection, risk management, and behavioral analysis.

Referring now to FIG. 1, FIG. 1 depicts a system 100 for learning continuous embedding space of RTP transactions according to non-limiting embodiments or aspects. The system 100 includes transaction database 102, first machine learning model system 104, embedding vector database 106, and/or second machine learning model system(s) 108.

Transaction database 102 may include one or more devices capable of receiving information from and/or communicating information to first machine learning model system 104 and/or second machine learning model system(s) 108. For example, transaction database 102 may include a computing device, such as a computer, a server, a group of servers, and/or other like devices. In some non-limiting embodiments or aspects, transaction database 102 may be in communication with a data storage device, which may be local or remote to transaction database 102. In some non-limiting embodiments or aspects, transaction database 102 may be capable of receiving information from, storing information in, communicating information to, or searching information stored in the data storage device.

First machine learning model system 104 may include one or more devices capable of receiving information from and/or communicating information to transaction database 102, embedding vector database 106, and/or second machine learning system(s) 108. For example, first machine learning model system 104 may include a computing device, such as a computer, a server, a group of serves, and/or other like devices. In some non-limiting embodiments or aspects, first machine learning model system 104 may be associated with a financial institution, a transaction service provider, and/or an issuer, as described herein. For example, first machine learning model system 104 may be operated by a financial institution, a transaction service provider, and/or an issuer.

Embedding vector database 106 may include one or more devices capable of receiving information from and/or communicating information to first machine learning model system 104 and/or second machine learning model system(s) 108. For example, embedding vector database 106 may include a computing device, such as a computer, a server, a group of serves, and/or other like devices. In some non-limiting embodiments or aspects, embedding vector database 106 may be in communication with a data storage device, which may be local or remote to embedding vector database 106. In some non-limiting embodiments or aspects, embedding vector database 106 may be capable of receiving information from, storing information in, communicating information to, or searching information stored in the data storage device.

Second machine learning model system(s) 108 may include one or more devices capable of receiving information from and/or communicating information to transaction database 102, first machine learning model system 104, and/or embedding vector database 106. For example, second machine learning model system(s) may include a computing device, such as a computer, a server, a group of serves, and/or other like devices. In some non-limiting embodiments or aspects, second machine learning model system(s) 108 may be associated with a financial institution, a transaction service provider, and/or an issuer as described here. For example, second machine learning model system(s) 108 may be operated by a financial institution, a transaction service provider, and/or an issuer.

In some non-limiting embodiments or aspects, first machine learning model system 104 may receive (e.g., from transaction database 102) RTP data associated with a plurality of RTP transactions, as described herein. For example, the RTP data for each RTP transaction may include a plurality of attributes, as described herein. The plurality of attributes may include a sender and a receiver, as described herein. Additionally or alternatively, first machine learning model system 104 may select one attribute of the plurality of attributes as the target attribute, as described herein. The plurality of attributes other than the target attribute may comprise a plurality of remaining attributes, as described herein. Additionally or alternatively, first machine learning model system 104 may train a first machine learning model to perform a first task comprising predicting the target attribute based on inputting the plurality of remaining attributes for each of the plurality of RTP transactions into the first machine learning model, as described herein. The first machine learning model may comprise at least one embedding layer and at least one hidden layer, as described herein. Additionally or alternatively, first machine learning model system 104 may, after training the model, convert each attribute of the plurality of attributes to a first vector using the at least one embedding layer of the first machine learning model to form a first set of vectors, as described herein. Additionally or alternatively, first machine learning model system 104 may store the first set of vectors (e.g., in embedding vector database 106), as described herein. Additionally or alternatively, first machine learning model system 104 may input the first set of vectors into a second machine learning model to perform at least one second task different than the first task, as described herein.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
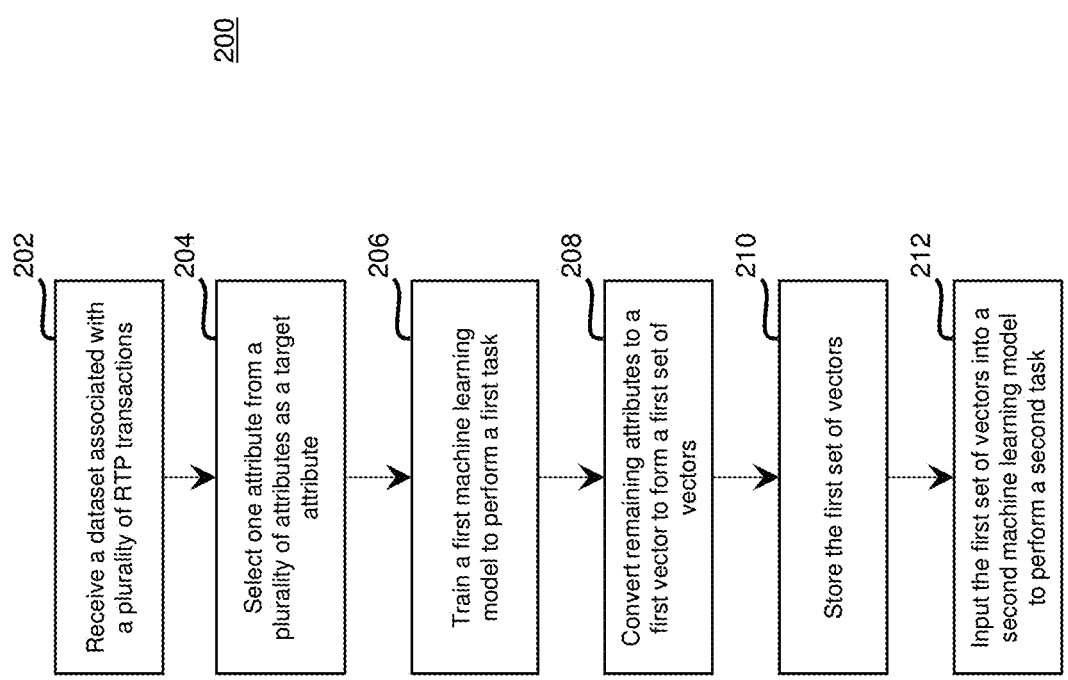
FIG. 2 is a flow diagram for a process for learning continuous embedding space of RTP transactions according to non-limiting embodiments or aspects.

Referring now to FIG. 2, shown is a process 200 for learning continuous embedding space of RTP transactions according to non-limiting embodiments or aspects. The steps shown in FIG. 2 are for example purposes only. It will be appreciated that additional, fewer, different, and/or a different order of steps may be used in non-limiting embodiments or aspects. In some non-limiting embodiments or aspects, one or more of the steps of process 200 may be performed (e.g., completely, partially, etc.) by first machine learning model system 104 (e.g., one or more devices of first machine learning model system 104). In some non-limiting embodiments or aspects, one or more of the steps of process 200 may be performed (e.g., completely, partially, etc.) by another device or group of devices separate from or including first machine learning model system 104, such as transaction database 102, embedding vector database 106, and/or second machine learning model system(s) 108 (e.g., one or more devices of second machine learning model system(s) 108).

As shown in FIG. 2, at step 202, process 200 may include receiving a dataset associated with a plurality of RTP transactions. For example, first machine learning model system 104 may receive RTP transaction data associated with a plurality of RTP transactions from transaction database 102. In some non-limiting embodiments or aspects, the RTP transaction data for each RTP transaction of the plurality of RTP transactions may include a plurality of attributes, including a sender and a receiver (e.g., a debtor and a creditor, respectively). Additionally or alternatively, the plurality of attributes may include client, customer, and/or account information and/or transaction information. For example, the plurality of attributes may include one or more of a creditor bank, a creditor routing number, a creditor account number, a debtor bank, a debtor routing number, a debtor account number, a RTP transaction amount and/or the like. In some non-limiting embodiments or aspects, the RTP data for each RTP transaction of the plurality of RTP transactions may include a plurality of fields. For example, each respective field of the plurality of fields may correspond to a respective attribute of the plurality of attributes (e.g., creditor bank, a creditor routing number, a creditor account number, a debtor bank, a debtor routing number, a debtor account number, a transaction amount and/or the like).

As shown in FIG. 2, at step 204, process 200 may include selecting one attribute from a plurality of attributes as a target attribute. For example, first machine learning model system 104 may select one of creditor bank, a creditor routing number, a creditor account number, a debtor bank, a debtor routing number, a debtor account number, or a transaction amount as the target attribute. In some non-limiting embodiments or aspects, the plurality of attributes may include a plurality of remaining attributes (i.e., any attribute that is not selected as the target attribute). For example, if first machine learning model system 104 selects the transaction amount as the target attribute, then all other attributes may be considered to be the plurality of remaining attributes. In some non-limiting embodiments or aspects, the target attribute may be a continuous value field. For example, the target attribute may be a transaction amount.

As shown in FIG. 2, at step 206, process 200 may include training a first machine learning model to perform a first task. For example, first machine learning model system 104 may train the first machine learning model to predict the target attribute for each of the plurality of RTP transactions based on inputting the plurality of remaining attributes for each of the plurality of RTP transactions into the first machine learning model. In some non-limiting embodiments or aspects, the first machine learning model may include two or more layers. For example, the first machine learning model may include at least one embedding layer and at least one hidden layer. In some non-limiting embodiments or aspects, the first machine learning model may be a natural language processing (NLP) model. In some non-limiting embodiments or aspects, the first machine learning model may be trained using a Continuous Bag of Attributes model (e.g., a Continuous Bag of Words model). For example, training the first machine learning model to perform the first task may include inputting each of the remaining attributes of each RTP transaction into the first machine learning model as a word of a sentence, and the target attribute may be the target word to be predicted based on the remaining attributes (e.g., words) of the RTP transaction (e.g., sentence). In some non-limiting embodiments or aspects, training the first machine learning model to perform the first task may include creating a negative sample of the RTP data. For example, first machine learning model system 104 may create a negative sample of the plurality of attributes.

As shown in FIG. 2, at step 208, process 200 may include converting the plurality of remaining attributes for each of the plurality of RTP transactions to a first vector to form a first set of vectors. For example, first machine learning model system 104 may convert each attribute of the plurality of remaining attributes to a first vector using the embedding layer(s) to form a first set of vectors.

As shown in FIG. 2, at step 210, process 200 may include storing the first set of vectors. For example, first machine learning model system 104 may store the first set of vectors in embedding vector database 106. For example, first machine learning model system 104 may communicate the first set of vectors to embedding vector database 106, which may receive and store the first set of vectors.

As shown in FIG. 2, at step 212, process 200 may include inputting the first set of vectors into a second machine learning model to perform a second task different than the first task. For example, embedding vector database 106 may communicate the first set of vectors to second machine learning model system(s) 108. Additionally or alternatively, second machine learning model system 108 may input the first set of vectors into a second machine learning model thereof. In some non-limiting embodiments or aspects, the second machine learning model may be a fraud detection model. For example, second machine learning model system 108 may input the first set of vectors into a fraud detection model. In some non-limiting embodiments or aspects, the second machine learning model may be a product recommendation model, a non-compliance detection model, an anomaly detection model, and/or the like.

The number and arrangement of steps shown in FIG. 2 are provided as an example. There may be additional steps, fewer steps, different steps, or differently arranged steps than those shown in FIG. 2. Furthermore, two or more steps shown in FIG. 2 may be implemented within a single step, or a single step shown in FIG. 2 may be implemented as multiple steps.

Figure 3:
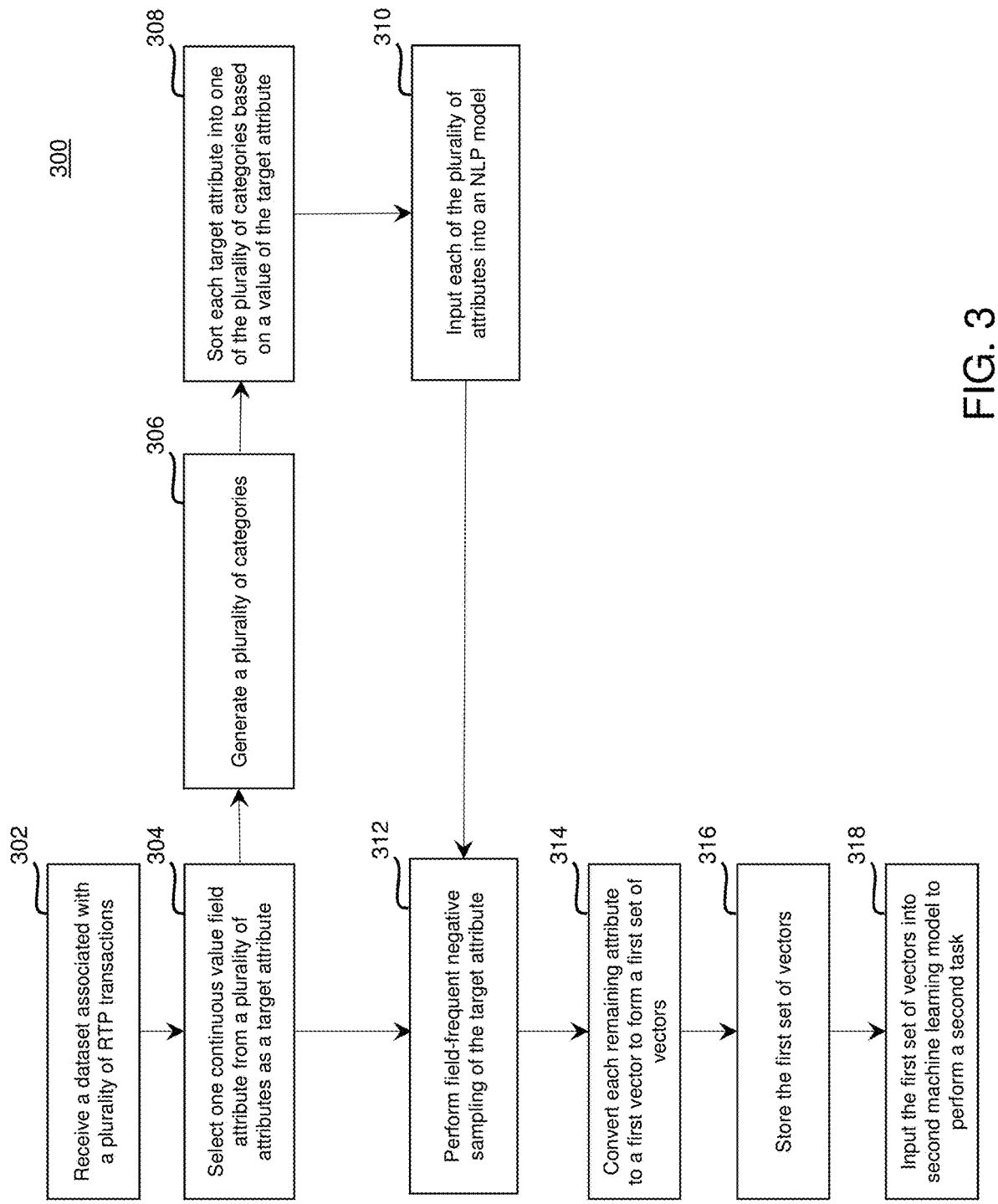
FIG. 3 is a flow diagram of an exemplary implementation of non-limiting embodiments or aspects of the process in FIG. 2.

Referring now to FIG. 3, shown is an exemplary implementation 300 of non-limiting embodiments or aspects of the process in FIG. 2. The steps shown in FIG. 3 are for example purposes only. It will be appreciated that additional, fewer, different, and/or a different order of steps may be used in non-limiting embodiments. In some non-limiting embodiments or aspects, one or more of the steps of implementation 300 may be performed (e.g., completely, partially, etc.) by first machine learning model system 104 (e.g., one or more devices of first machine learning model system 104). In some non-limiting embodiments or aspects, one or more of the steps of implementation 300 may be performed (e.g., completely, partially, etc.) by another device or group of devices separate from or including first machine learning model system 104, such as transaction database 102, embedding vector database 106, and/or second machine learning model system(s) 108 (e.g., one or more devices of second machine learning model system(s) 108).

As shown in FIG. 3, at step 302, process 300 may include receiving a dataset associated with a plurality of RTP transactions. For example, first machine learning model system 104 may receive RTP transaction data associated with a plurality of RTP transactions from transaction database 102.

A shown in FIG. 3, at step 304, process 300 may include selecting one continuous value field attribute from a plurality of attributes as the target attribute. For example, first machine learning model system 104 may select one attribute of the plurality of attributes that is a continuous value field attribute (e.g., transaction amount) as the target attribute.

As shown in FIG. 3, at step 306, process 300 may include generating a plurality of categories. For example, first machine learning model system 104 may generate two or more categories. In some non-limiting embodiments or aspects, each category of the plurality of categories may represent a range of values of the continuous field value. For example, first machine learning model system 104 may generate two or more categories that represent a range of values of the transaction amount (e.g., a first category associated with the range of $0-$500, a second category associated with the range of $501-$1,000, a third category associated with the range of $1,001-$1,500, etc.).

As shown in FIG. 3, at step 308, process 300 may include sorting each target attribute into one of the plurality of categories based on a value of the target attribute. For example, first machine learning model system 104 may sort each transaction amount into one of the plurality of categories representing a range of values based on the value of the transaction amount (e.g., a transaction amount of $108.11 would be sorted into the first category associated with the range of $0-$500).

As shown in FIG. 3, at step 310, process 300 may include inputting each of the plurality of attributes into an NLP model. For example, first machine learning model system 104 may be trained to predict the target attribute based on inputting the plurality of remaining attributes for each of the plurality of RTP transactions into the NLP model. In some non-limiting embodiments or aspects, the NLP model may include two or more layers. For example, the NLP model may include at least one embedding layer and at least one hidden layer. In some non-limiting embodiments or aspects, the NLP model may include a Continuous Bag of Attributes (CBOA) model (e.g., a Continuous Bag of Words (CBOW) model, wherein RTP transactions are treated as sentences and attributes of a respective RTP transaction are input as words of the sentence). For example, training the NLP model to perform the first task may include inputting each of the plurality of attributes of each RTP transaction into the NLP model as a word of a sentence to perform the task of predicting the target attribute.

As shown in FIG. 3, at step 312, process 300 may include performing field-frequent negative sampling to make training the NLP model more efficient. For example, first machine learning model system 104 may create a negative sample by generating a vector representative of a false RTP transaction for which the (category of) the transaction amount is incorrect for the remaining attributes (e.g., starting with a vector representative of a true RTP transaction that includes a true target value in the first category and associated remaining attributes, generate a vector using those same remaining attributes but make the category of the target value something different, such as the third category). In some non-limiting embodiments or aspects, step 312 may include performing negative sampling by creating a negative sample of the plurality of attributes based on an equal probability of selecting any single attribute sorted into one of the plurality of categories. In some non-limiting embodiments or aspects, step 312 may include performing field-frequent negative sampling by determining a frequency at which the target attribute appears in each of the plurality of categories and selecting the false category for the target attribute based on the relative frequency at which the target attribute appears in each respective category. For example, first machine learning model system 104 may determine the frequency at which each transaction amount appears in each of the plurality of categories (e.g., ranges of values). In some non-limiting embodiments or aspects, step 312 may include generating a negative sampling based on the frequencies at which the target attribute appears in the categories. For example, first machine learning model system 104 may generate a negative sample with the false target attribute in a particular category of the plurality of categories with a probability based on the frequency at which the transaction amount appears in that particular category.

As shown in FIG. 3, at step 314, process 300 may include converting the plurality of remaining attributes for each of the plurality of RTP transactions to a first vector to form a first set of vectors. For example, first machine learning model system 104 may convert each attribute of the plurality of remaining attributes to a first vector using at least one embedding layer to form a first set of vectors.

As shown in FIG. 3, at step 316, process 300 may include storing the first set of vectors. For example, the first set of vectors may be stored in embedding vector database 106.

As shown in FIG. 3, at step 318, process 300 may include inputting the first set of vectors into a second machine learning model to perform a second task different than the first task. For example, embedding vector database 106 may input the first set of vectors into second machine learning model system(s) 108. In some non-limiting embodiments or aspects, the second machine learning model may be a fraud detection model.

The number and arrangement of steps shown in FIG. 3 are provided as an example. There may be additional steps, fewer steps, different steps, or differently arranged steps than those shown in FIG. 3. Furthermore, two or more steps shown in FIG. 3 may be implemented within a single step, or a single step shown in FIG. 3 may be implemented as multiple steps.

Figure 4:
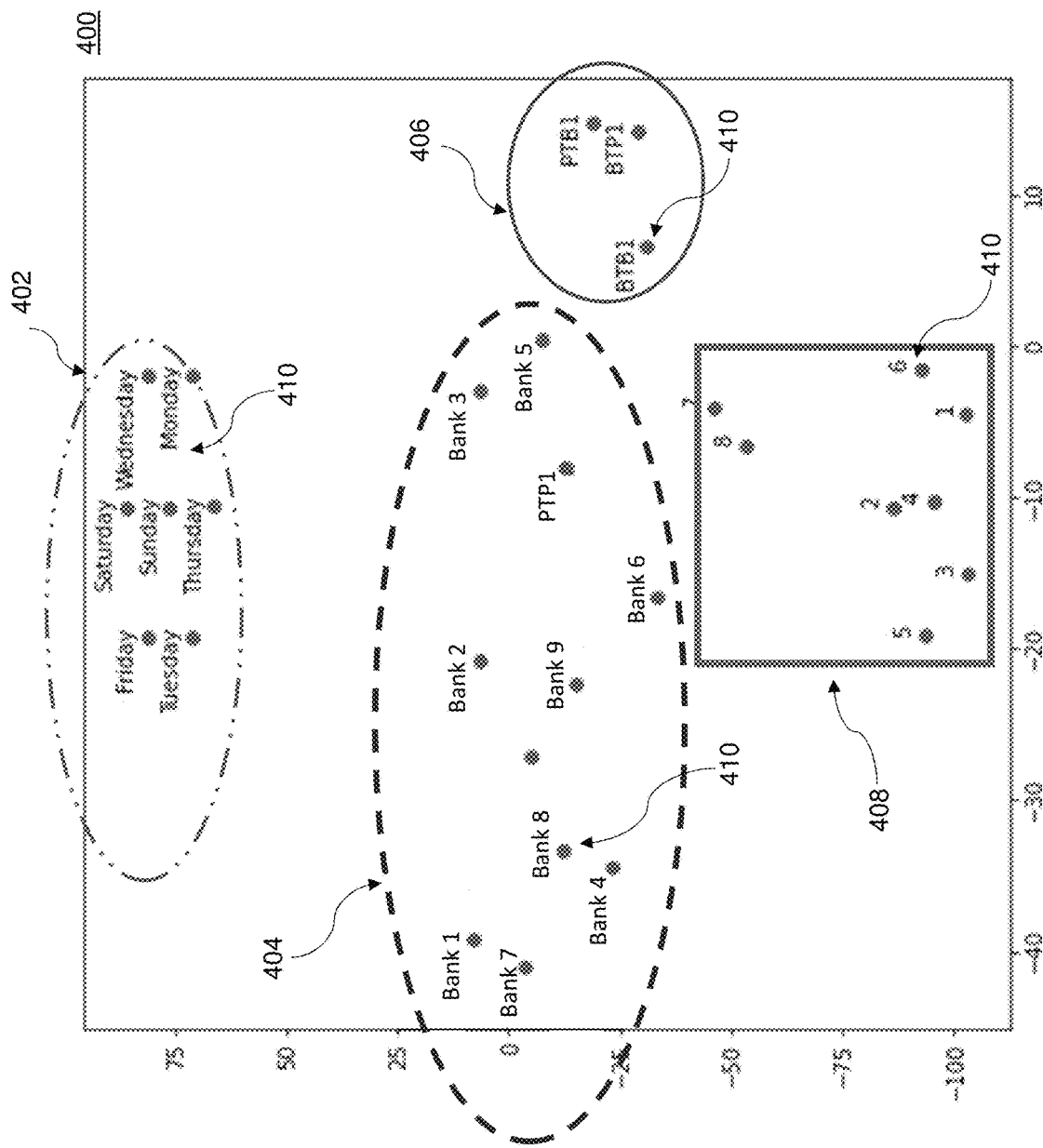
FIG. 4 is an exemplary graph of non-limiting embodiments or aspects of the process in FIG. 2.

Referring now to FIG. 4, shown is an exemplary graph 400 of non-limiting embodiments or aspects of the process in FIG. 2. The elements shown in FIG. 4 are for example purposes only. It will be appreciated that additional, fewer, and/or different elements may be used in non-limiting embodiments. As shown in FIG. 4, graph 400 includes a plurality of nodes 410, first dashed oval 402, second dashed oval 404, solid oval 406, and square 408. In some non-limiting embodiments or aspects, process 200 may include generating a graph of the vectors. For example, first machine learning model system 104 may generate a graph of the vectors representing the plurality of attributes. In some non-limiting embodiments or aspects, the plurality of nodes 410 may represent a plurality of vector embeddings for each of the plurality of attributes of the RTP data for each of the plurality of RTP transactions. In some non-limiting embodiments or aspects, a plurality of nodes 410 may form a cluster. In some non-limiting embodiments or aspects, a cluster of nodes 410 may represent vectors with similar attributes. For example, the plurality of nodes 410 representing the vectors for the attribute of the day of the week may be clustered together as indicated by first dashed oval 402. The plurality of nodes 410 representing the vectors for the attribute of the bank name may be clustered together as indicated by second dashed oval 404. The plurality of nodes 410 representing the vectors for the attribute of a person-to-person (e.g., PTP1), person-to-business (e.g., PTB1), business-to-person (e.g., BTP1), and/or business-to-business (e.g., BTB1) may be clustered together as indicated by solid oval 406. As shown in FIG. 4, a node representing the vector PTP1 is generally near the cluster indicated by solid oval 406, however, the reason it may be overlapping with another cluster is because graph 400 represents a projection of a higher-dimensional embedding space into a two-dimensional graph. The plurality of nodes 410 representing the plurality of categories (e.g., categories 1-8, which may be categories for the target attribute transaction amount, as described herein) may be clustered together as indicated by square 408. In some non-limiting embodiments or aspects, the clusters indicated by first dashed oval 402, second dashed oval 404, solid oval 406, and square 408 may be used to demonstrate that the first machine learning model (e.g., the NLP model) learned the meaning of each attribute without any a priori knowledge. In other words, the vectors represent relatively good embeddings of the attributes they represent because similar attributes have vectors that have similar values (and, hence, form a cluster because the nodes representing endpoints of such vectors are near each other).

Figure 5:
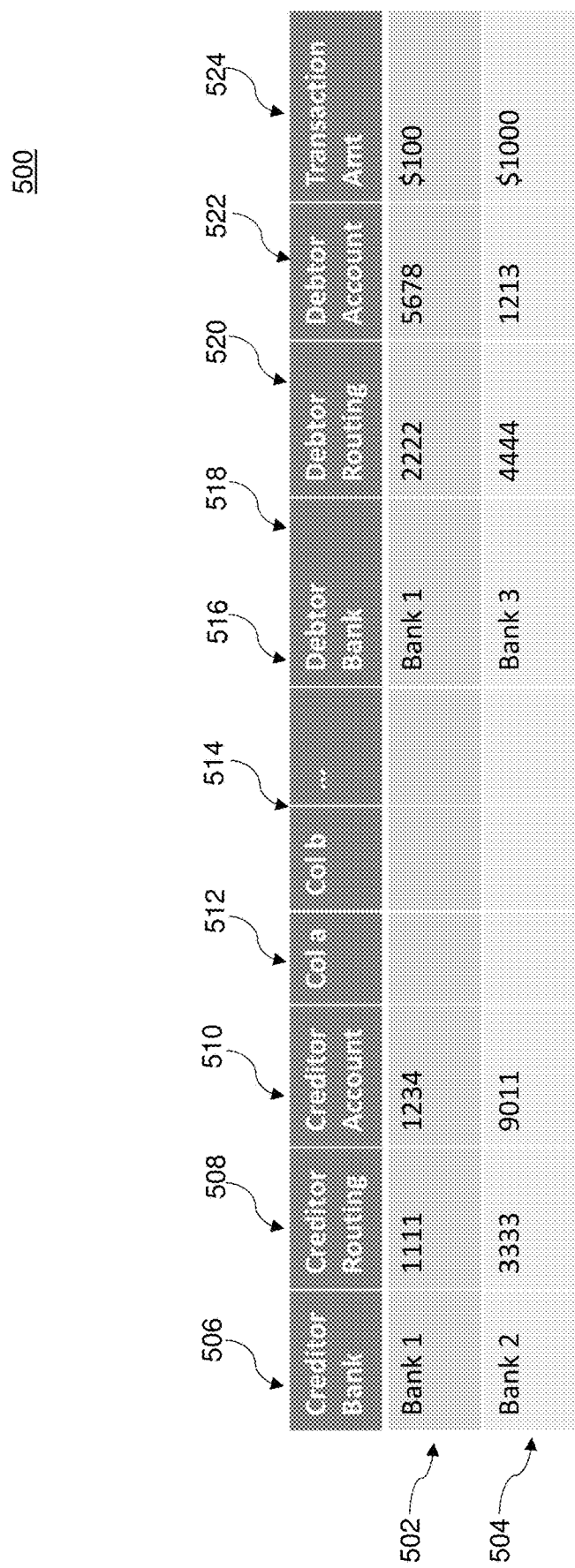
FIG. 5 is an exemplary input data table, including the data from a plurality of RTP transactions.

Referring now to FIG. 5, shown is a screen shot of an exemplary input data table 500, including the data from the plurality of RTP transactions. The elements shown in FIG. 5 are for example purposes only. It will be appreciated that additional, fewer, and/or different elements may be used in non-limiting embodiments. As shown in FIG. 5, input data table 500 includes rows 502 and 504 and columns 506, 508, 510, 512, 514, 516, 518, 520, 522, and 524.

In some non-limiting embodiments or aspects, rows 502 and 504 may each include RTP transaction data for one of the plurality of RTP transactions. For example, the data in row 502 may include the data from a first RTP transaction and the data in row 504 may include the data from a second RTP transaction. In some non-limiting embodiments or aspects, the number of rows may be equal to the number of the plurality of RTP transactions.

In some non-limiting embodiments or aspects, columns 506, 508, 510, 512, 514, 516, 518, 520, 522, and 524 may include the plurality of fields and/or the plurality of attributes for each of the plurality of RTP transactions. For example, each column 506, 508, 510, 512, 514, 516, 518, 520, 522, and 524 may represent one of the plurality of fields corresponding to a respective attribute of the plurality of attributes, including creditor bank column 506 (e.g., the receiver), creditor routing number column 508, creditor account number 510, col a 512, col b 514, miscellaneous column(s) 516, debtor bank column 518 (e.g., the sender), debtor routing number column 520, debtor account column 522, and transaction amount column 524. In some non-limiting embodiments or aspects, the number of columns may be equal to the number of the plurality of fields and/or the plurality of attributes. In some non-limiting embodiments or aspects, the data in one column may be selected as the target attribute. For example, the data in column 524, transaction amount (e.g., Amt), may be selected as the target attribute.

Figure 6A:
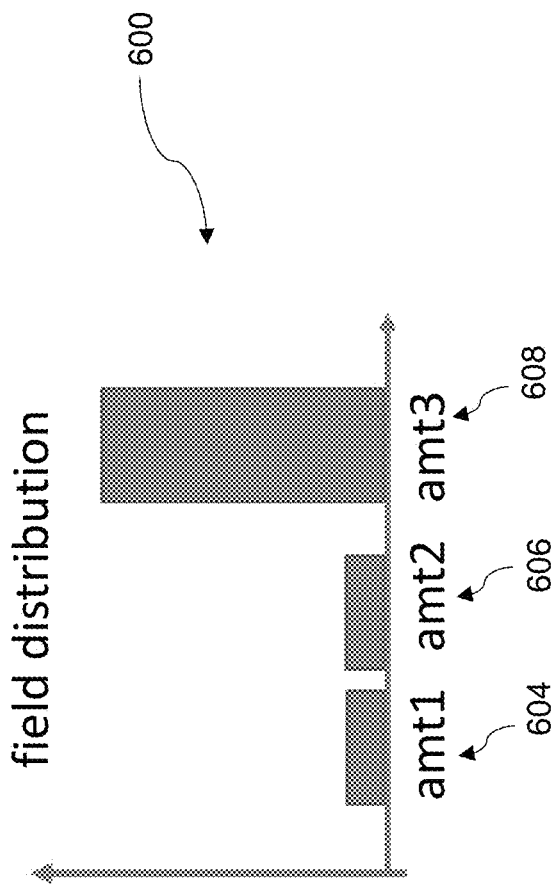
FIGS. 6A and 6B are an exemplary field distribution bar graph illustrating the distribution of the target attribute and an example of field-frequent negative sampling using the input data table in FIG. 5, respectively.
Figure 6B:
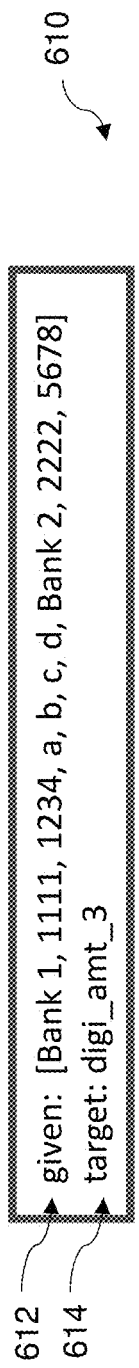

Referring now to FIGS. 6A and 6B, shown is an exemplary field distribution bar graph 600 illustrating the distribution (e.g., frequency) of the target attribute and an example of field-frequent negative sampling 610 using the data from the input data table in FIG. 5, respectively. As shown in FIG. 6A, field distribution bar graph 600 may include categories 604, 606, and 608. In some non-limiting embodiments or aspects, each category 604, 606, and 608 may represent one of the plurality of categories. The vertical axis may represent the number of target values and/or the frequency of target values in each category. In some non-limiting embodiments or aspects, each category 604, 606, and 608 may represent a range of values of a continuous value field. For example, first machine learning model system 104 may generate a plurality of categories 604, 606, and 608 (e.g., amt1, amt2, and amt3), wherein each category 604, 606, and 608 represents a range of values of the transaction amount (e.g., amt1=$0-$500, amt2=$501-$1,000, and amt3=$1,001-$1,500). In some non-limiting embodiments or aspects, each target attribute may be stored in one of categories 604, 606, and 608 based on the value of the target attribute. For example, for category 604 (e.g., amt1=$0-$500), category 606 (amt2=$501-$1,000), and category 608 (amt3=$1,001-$1,500), first machine learning model system 104 would store a transaction amount of $1,222.88 in category 608 (e.g., amt3=$501-$1,000).

As shown in FIG. 6B, field-frequent negative sample 610 includes field-frequent negative sample input vector 612 and false target 614. In some non-limiting embodiments or aspects, field-frequent negative sample input vector 612 may use input data from a true RTP transaction. For example, field-frequent negative sample input vector 612 may use the input data from input data table 500, shown in FIG. 5, to perform field-frequent negative sampling, as described above at step 312. In some non-limiting embodiments or aspects, false target 614 may be a category of the plurality of categories different than the true target attributed value for the respective row from input data table 500. For example, false target 614 may be one of categories 604, 606, and 608, as shown in FIG. 6A, other than the true category. As shown in FIGS. 6A and 6B, the target attribute appears more frequently in category 608, amt 3, than the other categories. Therefore, the probability of selecting category 608 as false target 614 for field-frequent negative sampling may be higher than selecting either category 604 or 606 based on the frequency at which a target attribute appears in category 608. For example, the probability of selecting amt 3 as false target value 614 may be proportional to the frequency associated with category 608, and the probability of selecting amt 1 or amt 2 as false target value 614 may be proportional to the frequency associated with category 604 or category 608, respectively. As such, performing field-frequent negative sampling takes into account the frequency that a target value appears within the plurality of categories. The probability of selecting a particular category of the plurality of categories is, therefore, based on the frequency that the value of the target attribute for each RTP transaction of the plurality of RTP transactions falls within the particular category.

The number and arrangement of elements shown in FIGS. 6A and 6B are provided as an example. There may be additional elements, fewer elements, different elements, or differently arranged elements than those shown in FIGS. 6A and 6B.

Figure 7A:
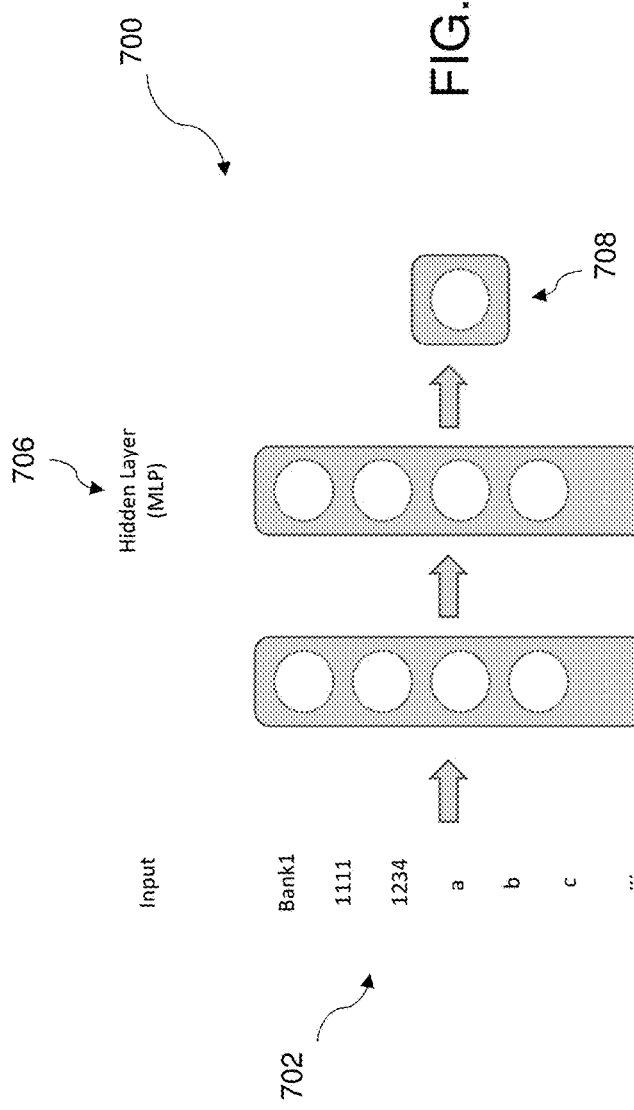
FIGS. 7A and 7B are an exemplary first machine learning model and exemplary embedding vectors generated for exemplary attributes, respectively.
Figure 7B:
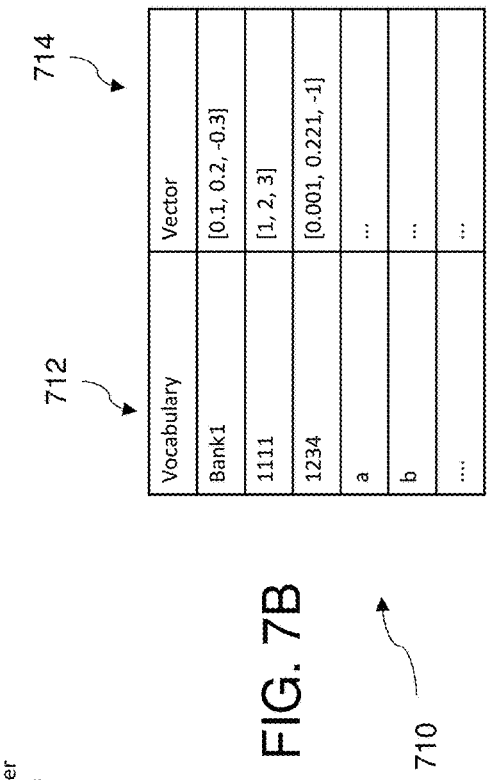

Referring now to FIGS. 7A and 7B, shown is an exemplary first machine learning model 700 and results 710. A shown in FIG. 7A, first machine learning model 700 may include input 702, embedding layer 704, hidden layer 706, and output layer 708. First machine learning model 700 may receive input 702. For example, first machine learning model system 104 may train the first machine learning model to predict the target attribute for each of the plurality of RTP transactions based on inputting the plurality of remaining attributes for each of the plurality of RTP transactions into the first machine learning model. In some non-limiting embodiments or aspects, the first machine learning model may be a natural language processing (NLP) model. In some non-limiting embodiments or aspects, the first machine learning model may be trained using a Continuous Bag of Attributes model (e.g., a Continuous Bag of Words model), as described herein. For example, training the first machine learning model to perform the first task may include inputting each of the remaining attributes of each RTP transaction into the first machine learning model as a word of a sentence, and the target attribute may be the target word to be predicted based on the remaining attributes (e.g., words) of the RTP transaction (e.g., sentence). In some non-limiting embodiments or aspects, the first machine learning model may include embedding layer 704 and hidden layer 706. In some non-limiting embodiments or aspects, first machine learning model 700 may generate an output (e.g., prediction of the target attribute) at output layer 708 based on the inputs forward propagating through embedding layer 704 and hidden layer 706.

As shown in FIG. 7B, results 710 may include vocabulary column 712 and vector column 714. In some non-limiting embodiments or aspects, vocabulary column 712 may include the attributes (e.g., inputs 702) of the RTP data. For example, vocabulary column 712 may comprise the plurality of attributes. In some non-limiting embodiments or aspects, vector column 714 may include vectors generated for each respective attribute based on embedding layer 704. For example, vector column 714 may comprise vectors representing each of the plurality of attributes generated by embedding layer 704.

The number and arrangement of elements shown in FIGS. 7A and 7B are provided as an example. There may be additional elements, fewer elements, different elements, or differently arranged elements than those shown in FIGS. 7A and 7B.

Figure 8:
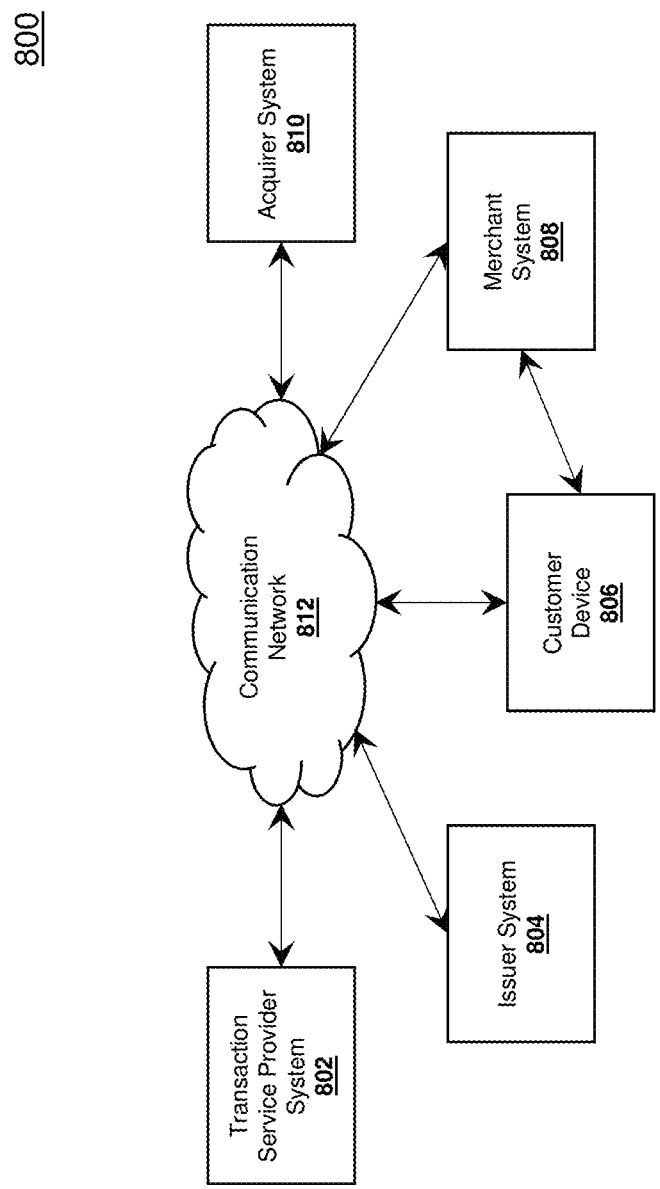
FIG. 8 is a diagram of non-limiting embodiments or aspects of an environment in which methods, systems, and/or computer program products, described herein, may be implemented according to the principles of the presently disclosed subject matter.

Referring now to FIG. 8, shown is a diagram of non-limiting embodiments or aspects of an environment in which methods, systems, and/or computer program products, described herein, may be implemented according to the principles of the presently disclosed subject matter. As shown in FIG. 8, environment 800 includes transaction service provider system 802, issuer system 804, customer device 806, merchant system 808, acquirer system 810, and communication network 812. In some non-limiting embodiments or aspects, each of transaction database 102, first machine learning system 104, embedding vector database 106, and second machine learning model system(s) 108 may be implemented by (e.g., part of) transaction service provider system 802. In some non-limiting embodiments or aspects, at least one of transaction database 102, first machine learning system 104, embedding vector database 106, and second machine learning model system(s) 108 may be implemented by (e.g., part of) another system, another device, another group of systems, or another group of devices, separate from or including transaction service provider system 802, such as issuer system 804, merchant system 808, acquirer system 810, and/or the like.

Transaction service provider system 802 may include one or more devices capable of receiving information from and/or communicating information to issuer system 804, customer device 806, merchant system 808, and/or acquirer system 810 via communication network 812. For example, transaction service provider system 802 may include a computing device, such as a server (e.g., a transaction processing server), a group of servers, and/or other like devices. In some non-limiting embodiments or aspects, transaction service provider system 802 may be associated with a transaction service provider as described herein. In some non-limiting embodiments or aspects, transaction service provider system 802 may be in communication with a data storage device, which may be local or remote to transaction service provider system 802. In some non-limiting embodiments or aspects, transaction service provider system 802 may be capable of receiving information from, storing information in, communicating information to, or searching information stored in the data storage device.

Issuer system 804 may include one or more devices capable of receiving information and/or communicating information to transaction service provider system 802, customer device 806, merchant system 808, and/or acquirer system 810 via communication network 812. For example, issuer system 804 may include a computing device, such as a server, a group of servers, and/or other like devices. In some non-limiting embodiments or aspects, issuer system 804 may be associated with an issuer institution as described herein. For example, issuer system 804 may be associated with an issuer institution that issued a credit account, debit account, credit card, debit card, and/or the like to a user associated with customer device 806.

Customer device 806 may include one or more devices capable of receiving information from and/or communicating information to transaction service provider system 802, issuer system 804, merchant system 808, and/or acquirer system 810 via communication network 812. Additionally or alternatively, each customer device 806 may include a device capable of receiving information from and/or communicating information to other customer devices 806 via communication network 812, another network (e.g., an ad hoc network, a local network, a private network, a virtual private network, and/or the like), and/or any other suitable communication technique. For example, customer device 806 may include a client device and/or the like. In some non-limiting embodiments or aspects, customer device 806 may or may not be capable of receiving information (e.g., from merchant system 808 or from another customer device 806) via a short-range wireless communication connection (e.g., an NFC communication connection, an RFID communication connection, a Bluetooth® communication connection, a Zigbee® communication connection, and/or the like), and/or communicating information (e.g., to merchant system 808) via a short-range wireless communication connection.

Merchant system 808 may include one or more devices capable of receiving information from and/or communicating information to transaction service provider system 802, issuer system 804, customer device 806, and/or acquirer system 810 via communication network 812. Merchant system 808 may also include a device capable of receiving information from customer device 806 via communication network 812, a communication connection (e.g., an NFC communication connection, an RFID communication connection, a Bluetooth® communication connection, a Zigbee® communication connection, and/or the like) with customer device 806, and/or the like, and/or communicating information to customer device 806 via communication network 812, the communication connection, and/or the like. In some non-limiting embodiments or aspects, merchant system 808 may include a computing device, such as a server, a group of servers, a client device, a group of client devices, and/or other like devices. In some non-limiting embodiments or aspects, merchant system 808 may be associated with a merchant as described herein. In some non-limiting embodiments or aspects, merchant system 808 may include one or more client devices. For example, merchant system 808 may include a client device that allows a merchant to communicate information to transaction service provider system 802. In some non-limiting embodiments or aspects, merchant system 808 may include one or more devices, such as computers, computer systems, and/or peripheral devices capable of being used by a merchant to conduct a transaction with a user. For example, merchant system 808 may include a POS device and/or a POS system.

Acquirer system 810 may include one or more devices capable of receiving information from and/or communicating information to transaction service provider system 802, issuer system 804, customer device 806, and/or merchant system 808 via communication network 812. For example, acquirer system 810 may include a computing device, a server, a group of servers, and/or the like. In some non-limiting embodiments or aspects, acquirer system 810 may be associated with an acquirer as described herein.

Communication network 812 may include one or more wired and/or wireless networks. For example, communication network 812 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 806, a POS device of merchant system 808, and/or the like) may initiate the transaction, e.g., by generating an authorization request. Additionally or alternatively, the client device (e.g., customer device 806, at least on device of merchant system 808, and/or the like) may communicate the authorization request. For example, customer device 806 may communicate the authorization request to merchant system 808 and/or a payment gateway (e.g., a payment gateway of transaction service provider system 802, a third-party payment gateway separate from transaction service provider system 802, and/or the like). Additionally or alternatively, merchant system 808 (e.g., a POS device thereof) may communicate the authorization request to acquirer system 810 and/or a payment gateway. In some non-limiting embodiments or aspects, acquirer system 810 and/or a payment gateway may communicate the authorization request to transaction service provider system 802 and/or issuer system 804. Additionally or alternatively, transaction service provider system 802 may communicate the authorization request to issuer system 804. In some non-limiting embodiments or aspects, issuer system 804 may determine an authorization decision (e.g., authorize, decline, and/or the like) based on the authorization request. For example, the authorization request may cause issuer system 804 to determine the authorization decision based thereof. In some non-limiting embodiments or aspects, issuer system 804 may generate an authorization response based on the authorization decision. Additionally or alternatively, issuer system 804 may communicate the authorization response. For example, issuer system 804 may communicate the authorization response to transaction service provider system 802 and/or a payment gateway. Additionally or alternatively, transaction service provider system 802 and/or a payment gateway may communicate the authorization response to acquirer system 810, merchant system 808, and/or customer device 806. Additionally or alternatively, acquirer system 810 may communicate the authorization response to merchant system 808 and/or a payment gateway. Additionally or alternatively, a payment gateway may communicate the authorization response to merchant system 808 and/or customer device 806. Additionally or alternatively, merchant system 808 may communicate the authorization response to customer device 806. In some non-limiting embodiments or aspects, merchant system 808 may receive (e.g., from acquirer system 810 and/or a payment gateway) the authorization response. Additionally or alternatively, merchant system 808 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 806 and/or the like) and/or transaction data associated with the transaction. For example, merchant system 808 (e.g., a client device of merchant system 808, a POS device of merchant system 808, and/or the like) may initiate the transaction, e.g., by generating an authorization request (e.g., in response to receiving the account identifier from a portable financial device of the customer and/or the like). Additionally or alternatively, merchant system 808 may communicate the authorization request to acquirer system 810. Additionally or alternatively, acquirer system 810 may communicate the authorization request to transaction service provider system 802. Additionally or alternatively, transaction service provider system 802 may communicate the authorization request to issuer system 804. Issuer system 804 may determine an authorization decision (e.g., authorize, decline, and/or the like) based on the authorization request, and/or issuer system 804 may generate an authorization response based on the authorization decision and/or the authorization request. Additionally or alternatively, issuer system 804 may communicate the authorization response to transaction service provider system 802. Additionally or alternatively, transaction service provider system 802 may communicate the authorization response to acquirer system 810, which may communicate the authorization response to merchant system 808.

For the purpose of illustration, clearing and/or settlement of a transaction may include generating a message (e.g., clearing message, settlement message, and/or the like) based on an account identifier of a customer (e.g., associated with customer device 806 and/or the like) and/or transaction data associated with the transaction. For example, merchant system 808 may generate at least one clearing message (e.g., a plurality of clearing messages, a batch of clearing messages, and/or the like). Additionally or alternatively, merchant system 808 may communicate the clearing message(s) to acquirer system 810. Additionally or alternatively, acquirer system 810 may communicate the clearing message(s) to transaction service provider system 802. Additionally or alternatively, transaction service provider system 802 may communicate the clearing message(s) to issuer system 804. Additionally or alternatively, issuer system 804 may generate at least one settlement message based on the clearing message(s). Additionally or alternatively, issuer system 804 may communicate the settlement message(s) and/or funds to transaction service provider system 802 (and/or a settlement bank system associated with transaction service provider system 802). Additionally or alternatively, transaction service provider system 802 (and/or the settlement bank system) may communicate the settlement message(s) and/or funds to acquirer system 810, which may communicate the settlement message(s) and/or funds to merchant system 808 (and/or an account associated with merchant system 808).

The number and arrangement of systems, devices, and/or networks shown in FIG. 8 are provided as an example. There may be additional systems, devices, and/or networks; fewer systems, devices, and/or networks; different systems, devices, and/or networks; and/or differently arranged systems, devices, and/or networks than those shown in FIG. 8. Furthermore, two or more systems or devices shown in FIG. 8 may be implemented within a single system or device, or a single system or device shown in FIG. 8 may be implemented as multiple, distributed systems or devices. Additionally or alternatively, a set of systems (e.g., one or more systems) or a set of devices (e.g., one or more devices) of environment 800 may perform one or more functions described as being performed by another set of systems or another set of devices of environment 800.

Referring now to FIG. 9, shown is a diagram of example components of a device 900 according to non-limiting embodiments or aspects. Device 900 may correspond to transaction database 102, first machine learning system 104, embedding vector database 106, and second machine learning model system (s) 108 in FIG. 1, as an example. In some non-limiting embodiments or aspects, such systems or devices may include at least one device 900 and/or at least one component of device 900. The number and arrangement of components shown are provided as an example. In some non-limiting embodiments or aspects, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

As shown in FIG. 9, device 900 may include bus 902, processor 904, memory 906, storage component 908, input component 910, output component 912, and communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 9, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method, comprising:
receiving, with at least one processor, real time payment (RTP) data associated with a plurality of RTP transactions, wherein the RTP data for each RTP transaction of the plurality of RTP transactions comprises a plurality of attributes, the plurality of attributes including a sender and a receiver;
selecting, with the at least one processor, one attribute of the plurality of attributes as a target attribute, wherein the target attribute comprises a continuous value field, and wherein the plurality of attributes other than the target attribute comprise a plurality of remaining attributes;
generating, with the at least one processor, a plurality of categories;
sorting, with the at least one processor, each target attribute into one of the plurality of categories based on a value of the target attribute, wherein the plurality of categories each represent a range of values of the continuous value field;
training, with the at least one processor, a first machine learning model to perform a first task comprising predicting the target attribute based on inputting the plurality of remaining attributes for each of the plurality of RTP transactions into the first machine learning model, wherein the first machine learning model comprises a natural language processing (NLP) model, wherein the NLP model comprises at least one embedding layer and at least one hidden layer, and wherein the training comprises:
inputting each of the plurality of attributes of each RTP transaction into the NLP model as a word of a sentence; and
creating a negative sample of the target attribute based on an equal probability of selecting any single target attribute sorted into one of the plurality of categories, wherein creating the negative sample comprises:
determining a frequency at which the target attribute appears in each of the plurality of categories; and
performing negative sampling of the target attribute based on the frequency at which the target attribute appears in each of the plurality of categories;
after training the NLP model, converting, with the at least one processor, each attribute of the plurality of remaining attributes to a first vector using the at least one embedding layer of the NLP model to form a first set of vectors;
storing, with the at least one processor, the first set of vectors; and
inputting, with the at least one processor, the first set of vectors into a second machine learning model to perform at least one second task different than the first task, wherein the second machine learning model comprises an anomaly detection model, and wherein the at least one second task comprises anomaly detection of future RTP transactions.

2. The computer-implemented method of claim 1, wherein the RTP data for each RTP transaction of the plurality of RTP transactions comprises a plurality of fields, each respective field of the plurality of fields corresponding to a respective attribute of the plurality of attributes.

3. The computer-implemented method of claim 1, further comprising: generating, with the at least one processor, a graph comprising a plurality of nodes based on the first set of vectors, wherein each of the plurality of nodes represents one of the plurality of RTP transactions.

4. A system comprising:
at least one processor; and
at least one non-transitory computer readable medium comprising instructions to direct the at least one processor to:
receive real time payment (RTP) data associated with a plurality of RTP transactions, wherein the RTP data for each RTP transaction of the plurality of RTP transactions comprises a plurality of attributes, the plurality of attributes including a sender and a receiver;
select one attribute of the plurality of attributes as a target attribute, wherein the target attribute comprises a continuous value field, and wherein the plurality of attributes other than the target attribute comprise a plurality of remaining attributes;
generate a plurality of categories;
store each target attribute into one of the plurality of categories based on a value of the target attribute, wherein the plurality of categories each represent a range of values of the continuous value field;
train a first machine learning model to perform a first task comprising predicting the target attribute based on inputting the plurality of remaining attributes for each of the plurality of RTP transactions into the first machine learning model, wherein the first machine learning model comprises a natural language processing (NLP) model, wherein the NLP model comprises at least one embedding layer and at least one hidden layer, and wherein when training, the at least one processor is directed to:
- input each of the plurality of attributes of each RTP transaction into the NLP model as a word of a sentence; and
- create a negative sample of the target attribute based on an equal probability of selecting any single target attribute sorted into one of the plurality of categories, wherein when creating the negative sample, the at least one processor is directed to:
  - determine a frequency at which the target attribute appears in each of the plurality of categories; and
  - perform negative sampling of the target attribute based on the frequency at which the target attribute appears in each of the plurality of categories;
- after training the NLP model, convert each attribute of the plurality of remaining attributes to a first vector using the at least one embedding layer of the NLP model to form a first set of vectors;
- store the first set of vectors; and
- input the first set of vectors into a second machine learning model to perform at least one second task different than the first task, wherein the second machine learning model comprises an anomaly detection model, and wherein the at least one second task comprises anomaly detection of future RTP transactions.

5. The system of claim 4, wherein the RTP data for each RTP transaction of the plurality of RTP transactions comprises a plurality of fields, each respective field of the plurality of fields corresponding to a respective attribute of the plurality of attributes.

6. The system of claim 4, wherein the at least one processor is further programmed or configured to:
- generate a graph comprising a plurality of nodes based on the first set of vectors, wherein each of the plurality of nodes represents one of the plurality of RTP transactions.

7. A computer program product comprising at least one non-transitory computer-readable medium including one or more instructions that, when executed by at least one processor, cause the at least one processor to:
- receive real time payment (RTP) data associated with a plurality of RTP transactions, wherein the RTP data for each RTP transaction of the plurality of RTP transactions comprises a plurality of attributes, the plurality of attributes including a sender and a receiver;
- select one attribute of the plurality of attributes as a target attribute, wherein the target attribute comprises a continuous value field, and wherein the plurality of attributes other than the target attribute comprise a plurality of remaining attributes;
- generate a plurality of categories;
- sort each target attribute into one of the plurality of categories based on a value of the target attribute, wherein the plurality of categories each represent a range of values of the continuous value field;
- train a first machine learning model to perform a first task comprising predicting the target attribute based on inputting the plurality of remaining attributes for each of the plurality of RTP transactions into the first machine learning model, wherein the first machine learning model comprises a natural language processing (NLP) model, wherein the NLP model comprises at least one embedding layer and at least one hidden layer, and wherein the one or more instruction that cause the processor to train cause the at least one processor to:
  - input each of the plurality of attributes of each RTP transaction into the NLP model as a word of a sentence; and
  - create a negative sample of the target attribute based on an equal probability of selecting any single target attribute sorted into one of the plurality of categories, wherein the one or more instruction that cause the at least one processor to create the negative sample cause the at least one processor to:
    - determine a frequency at which the target attribute appears in each of the plurality of categories; and
    - perform negative sampling of the target attribute based on the frequency at which the target attribute appears in each of the plurality of categories;
- after training the NLP model, convert each attribute of the plurality of remaining attributes to a first vector using the at least one embedding layer of the NLP model to form a first set of vectors;
- store the first set of vectors; and
- input the first set of vectors into a second machine learning model to perform at least one second task different than the first task, wherein the second machine learning model comprises an anomaly detection model, and wherein the at least one second task comprises anomaly detection of future RTP transactions.

8. The computer program product of claim 7, wherein the RTP data for each RTP transaction of the plurality of RTP transactions comprises a plurality of fields, each respective field of the plurality of fields corresponding to a respective attribute of the plurality of attributes.

9. The computer program product of claim 7, wherein the one or more instructions that cause the at least one processor to train generate a graph comprising a plurality of nodes based on the first set of vectors, wherein each of the plurality of nodes represents one of the plurality of RTP transactions.

* * * * *